United States Patent
Chafer et al.

(10) Patent No.: US 8,381,235 B2
(45) Date of Patent: Feb. 19, 2013

(54) PERSONAL TOKEN HAVING ENHANCED ABILITIES FOR DELIVERING HTML DATA

(75) Inventors: Sylvain Chafer, Meudon Cedex (FR);
Franck Dehlinger, Meudon Cedex (FR);
Laurent Castillo, Meudon Cedex (FR)

(73) Assignee: Gemalto SA, Meudon Cedex (FR)

( * ) Notice: Subject to any disclaimer, the term of this patent is extended or adjusted under 35 U.S.C. 154(b) by 762 days.

(21) Appl. No.: 12/528,228

(22) PCT Filed: Jan. 22, 2008

(86) PCT No.: PCT/IB2008/000205
§ 371 (c)(1),
(2), (4) Date: Aug. 21, 2009

(87) PCT Pub. No.: WO2008/102221
PCT Pub. Date: Aug. 28, 2008

(65) Prior Publication Data
US 2010/0319009 A1    Dec. 16, 2010

(30) Foreign Application Priority Data

Feb. 21, 2007    (EP) .................................... 07290222

(51) Int. Cl.
*G06F 3/00* (2006.01)
*G06F 17/00* (2006.01)
(52) U.S. Cl. .......................... 719/328; 715/234; 715/239
(58) Field of Classification Search ........................ None
See application file for complete search history.

(56) References Cited

U.S. PATENT DOCUMENTS

| 6,971,108 B1 * | 11/2005 | Clark et al. ..................... 719/316 |
| 7,174,506 B1 * | 2/2007 | Dunsmoir et al. ............. 715/207 |
| 7,194,678 B1 * | 3/2007 | Koike et al. ..................... 715/234 |
| 2001/0034839 A1 * | 10/2001 | Karjoth et al. ................. 713/190 |
| 2005/0033688 A1 * | 2/2005 | Peart et al. ....................... 705/39 |
| 2005/0171983 A1 * | 8/2005 | Deo et al. ....................... 707/202 |
| 2005/0204281 A1 * | 9/2005 | Choate ........................... 715/513 |

(Continued)

FOREIGN PATENT DOCUMENTS

| EP | 1 496 480 A | 1/2005 |
| EP | 1 626 349 A | 2/2006 |

OTHER PUBLICATIONS

International Search Report from PCT/IB2008/000205 dated Jun. 5, 2008 (3 pages).

(Continued)

*Primary Examiner* — Emerson Puente
*Assistant Examiner* — Adam Lee
(74) *Attorney, Agent, or Firm* — Osha • Liang LLP

(57) ABSTRACT

The invention relates to a personal token storing a javacard application code lying over an area of the memory of the personal token, the personal token being able to run such javacard application so as to deliver HTML page data to an external device for the external device to display an HTML page on the basis of the such delivered HTML page data, said personal token further storing data to be used as a constructing part of the HTML page, characterized in that the data to be used as a contributing part of the HTML page are in at least one file which is separate from the memory area over which the Javacard application code is lying, and the personal token is programmed for opening the at least one file storing the contributing part of the HTML page when such data are requested for delivering said HTML page data to said external device.

9 Claims, 2 Drawing Sheets

U.S. PATENT DOCUMENTS

2006/0259910 A1* 11/2006 Popp et al. .................... 719/315

OTHER PUBLICATIONS

Written Opinion from PCT/IB2008/000205 dated Jun. 5, 2008 (8 pages).

Urinen, P.; "Programming Internet Smartcard with XML Scripts"; Lecture Notes in Computer Science, Springer-Verlag; vol. 2140; 2001; pp. 228-241.

* cited by examiner

PERSONAL TOKEN HAVING ENHANCED ABILITIES FOR DELIVERING HTML DATA

BACKGROUND

The invention relates to personal security tokens when hosting Javacard applications for delivering html pages to an envisioning device. Such personal tokens are generally known as personal tokens including a web or HTML server.

Personal tokens are used for authenticating a user when such user accesses to a limited or a private resources equipment such as a mobile telecommunication network, a bank facility or network, a remote server storing secret data or even a protected area with limited physical access thereto.

The mostly known device of this type is the IC card such as for example a SIM card (Subscriber Identification Module) or a credit card, but it can also be a USB key, a mass memory card, or any kind of token carrying some necessary credentials. Such tokens are typically compliant with international standard ISO7816.

The envisioning device is typically the mobile terminal in a mobile telephony network, but can also a hosting PC or a remote terminal in an IT network, either the internet or a company internal network.

Javacard is a language and programming system which is derived from Java, i.e. with simplified functionalities due to the reduced abilities of smart cards, but retaining the main aspects of Java such as downloading of .cap file, instantiation, registering, using application Ids, and more importantly a selected group of the original Java language instructions, which make Javacard keep the object-oriented nature of original Java. Javacard enabled smart cards or USB dongles are well-known.

Oftentimes Javacard is used for delivering HTML data to a hosting device, which hosting device runs an HTML engine, which engine reads the such delivered HTML data and constructs an HTML page departing on such delivered data. The delivered HTML data are sufficient data for describing the content to be found in the HTML page, i.e. static objects, dynamic objects, and a template for organizing the static and dynamic objects in the page.

Javacard applications are loaded into security tokens either over-the-air, either by wired means i.e. in the factory while customizing the token, or even at a selling point by means of a local computer with some dedicated connections and a driver for that purpose. Javacard applications are difficult to update. Some Javacard data which are already present in the token are oftentimes impossible to modify, which means that the whole application has to be downloaded in a new version which encompasses the modified data. This also means that the token has to be either brought back to factory or to a selling point, or that a new downloading of the complete application code, i.e. of the .cap file, has to be carried out over-the-air, which is long and fastidious for the operator and requires difficult memory management in the token.

This appears to be particularly true for application codes which are dedicated to delivering HTML page data when it appears necessary to amend the HTML page.

For example, changing an object in the HTML page or amending the template of the HTML page for emphasizing a particular object rather than another one requires the Javacard application to be downloaded again in the card and interpreted again by the card in its modified version.

SUMMARY

The purpose of the invention is to solve this problem, e.g., to propose an implementation of a Javacard application in a personal token which eases the process of amending HTML pages to be displayed when a personal token is implied. Such purpose is achieved by the invention though the features as recited in the appended claims. Other aspects, aims and advantages of the invention will appear through the following description.

DETAILED DESCRIPTION

Figure 1:
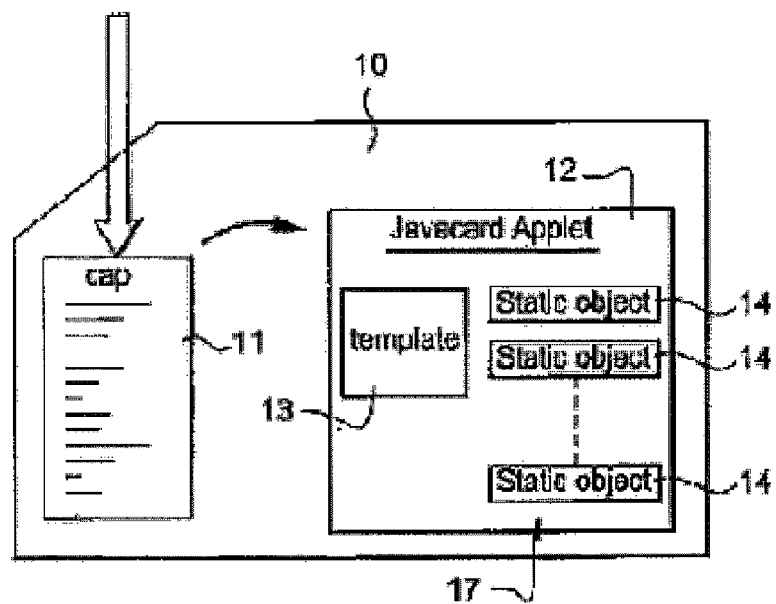
FIG. 1 represents a SIM card embarking a Javacard application according to prior art.

As represented on FIG. 1, for hosting a Javacard application such as a game, e-purse or phonebook application, a SIM card 10 according to the prior art is first downloaded with a .cap file 11, i.e. a set of Javacard instructions which have previously been compiled and converted inside a remote server. Such .cap file 11 still has to be interpreted so as to be rendered executable, i.e. the .cap file has to be instantiated by a Javacard Virtual Machine which Javacard Virtual Machine was present in the card prior to downloading. The .cap file then becomes what is called a Javacard applet as represented under reference 12 on FIG. 1.

This Javacard applet 12 is made of a series of instructions which are now coupled to parameters thanks to the performed instantiation step, which parameters were downloaded also inside the .cap file, but initially not coupled to the corresponding instructions.

The instructions of the Javacard applet 12 describe HTML data to be transmitted to the mobile terminal hosting the SIM card once an HTML page is required by an end-user. Such HTML page may be a welcoming Screensaver intended to be displayed when the end-user powers his mobile on, or a menu allowing the end-user to choose among several functionalities implemented in the SIM card 10.

Those HTML data in the Javacard applet comprise template data 13 which describe the overall shape of the HTML page as well of the places some objects must have in the page, i.e. each place reserved for a static object or for a dynamic object in the page.

The Javacard applet also comprises instructions for building dynamic objects of the page, which may typically result from a calculation or from a particular state of the Javacard applet at the time the page is requested by the end-user.

The Javacard applet also comprises static objects data, i.e. data that describe objects which are not intended to change nor to be adapted in the course of running the Javacard applet.

Those static objects are references 14 on FIG. 1.

A SIM card running a Javacard application according to an embodiment of the invention will now be described in reference to FIG. 2.

Figure 2:
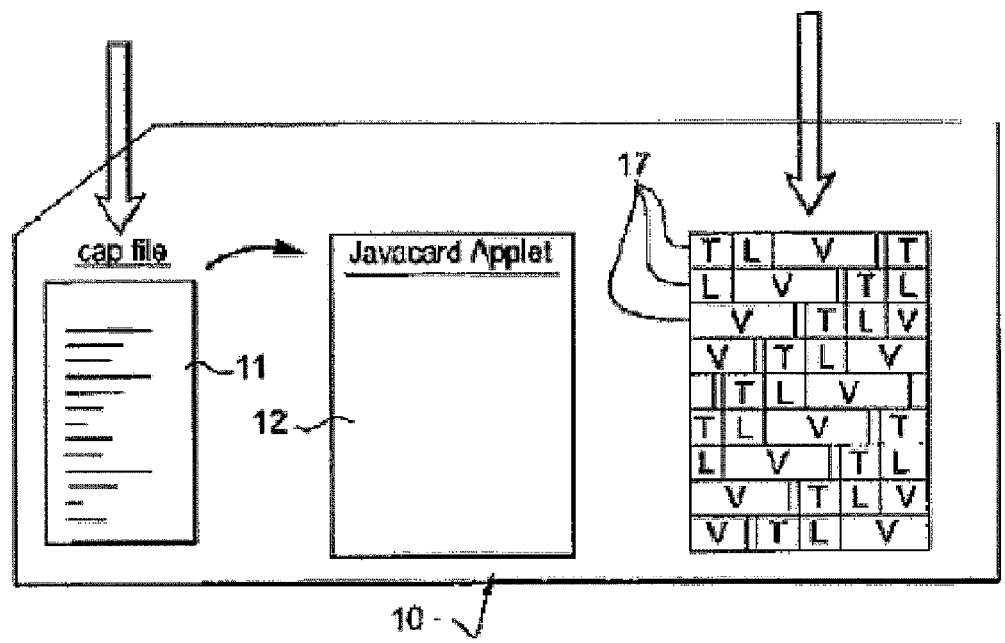
FIG. 2 represents a SIM card embarking Javacard application according to an embodiment of the present invention.

The SIM card of FIG. 2 hosts an instantiated and registered Javacard applet 12, The original .cap file 11 is represented on FIG. 2 but does no more operationally exist in the card 10 after the Javacard applet is instantiated.

The Javacard applet 12 is saved in a part of the memory of the SIM card which is usually dedicated to Javacard applets. This dedicated part is located inside the non-volatile portion of the memory of the card, usually implemented as EEPROM memory (Electrically Erasable Programmable Read Only Memory).

On the right side of FIG. 2, another physical part of the non-volatile memory is represented, which hosts a series of contiguous files 17. Each of these files is in the TLV format, i.e. is made of three parts. A first part of each TLV file a Tag part, the following part is a Length part which includes a Length amount, and the last part of the TLV file is a Value part which comprises a value which volume thereof determines the length as placed in the preceding Length part of the TLV file.

The TLV files of that part of the memory are usually used for storing communication parameters as listed and required in the telecommunication standards.

In addition to such purpose, those TLV files are here used for storing data which are intended to the Javacard applet 12 and aimed at constructing the HTML page data. The Javacard applet 12 is programmed for fetching those HTML data in the TLV files during the course of execution of the applet 12.

Here the HTML data such stored in the TLV files are of two types. Some TLV files store HTML template data, i.e. HTML data which describe the shape and overall construction of the page.

Other TLV files store data which describe HTML static objects.

One TLV file describes one template, several templates being presently described in several respective TLV files in the present case. As well one TLV file describes one static object, several static objects being presently described in several respective TLV files in the present case.

In each static object TLV file, each Value portion of the file is an HTML string which describes the content of the static object itself, each Length portion stores the actual length of the such HTML string, and each Tag portion stores an identifier of the static object itself, which identifier is used for retrieving the proper static object which is looked after.

A string in Javacard is a set of alphanumerical characters comprised between "<" and ">", which describes a visual object such as a static object to be placed in an HTML page.

Different formats of files might be considered for the storage of the HTML templates and the HTML static objects, from binary to BER-TLV formats. BER-TLV is the preferred format. A standard lightweight format is more generally favored.

For the purpose of retrieving the template data and the static objects data, the card 10 hosts and runs an API (application programming interface) referenced 18. The API 18 reads the template data, parses them, and transmits data either to the mobile terminal or back to the Javacard applet depending on the processing that has to be done on the considered data.

For example, when the template comprises static data and also identifies necessity for dynamic data by means of identifiers, the static data are transferred by the API 18 directly to the mobile terminal and the dynamic data identifiers are transmitted to the application 12 for further processing and rendering of such dynamic data.

Figure 3:
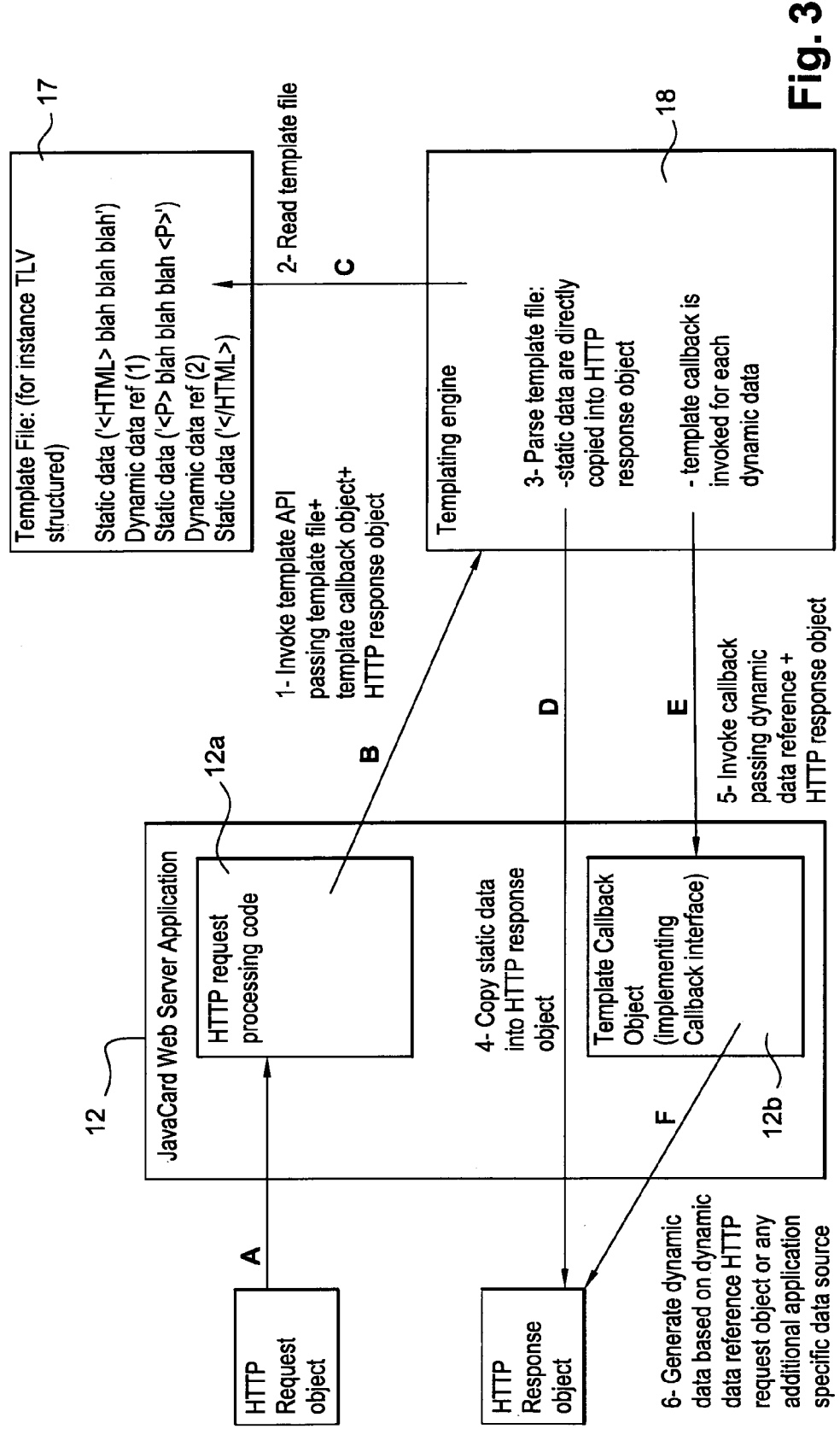
FIG. 3 is a diagram representing a series of tasks as performed by the SIM card according to the same embodiment of the invention.

On FIG. 3, steps referenced from A to E are represented which correspond to the successive tasks performed by the mobile terminal, the Javacard applet 12, the API 18. FIG. 3 also represents the data retrieved from the TLV files 17 in the process of gathering the HTML page data.

As a first step A, the mobile terminal makes an HTTP request to the application 12. The code of the application 12 includes a part 12a which is dedicated to processing the HTTP request. This HTTP request processing part 12a invokes, as step B, the API 18. The API 18 then reads as step C the template file in the corresponding TLV data file, which template here comprises static data including static strings, some of them describing respective static objects but which may also identify static data in other TLV files, which static data may describe static objects.

The template API 18 or templating engine then parses the template file into static data—as step D—and into dynamic identifiers which identify dynamic objects to be created. The API passes directly the static data to the mobile terminal and transfers the dynamic identifiers to the application 12.

Application 12 comprises a template callback module 12b which generates the identified dynamic objects when invoked by the template API 18. Application 12 implements this way a callback interface. For invoking the callback module 12b, the template API 18 transfers the dynamic data identifiers as well as the HTTP request object to the template callback module 12b—as step E—.

At step F, the template callback module 12b generates the identified dynamic data based on the dynamic data identifiers and on the HTTP request object, and on the basis of any additional application specific data source. In other words, the application logic uses the information received from the API as well as its own sources in order to generate the dynamic data. The dynamic data are then automatically added to the output HTML page.

The invention has been described in the case where static objects and template are stored in locations which are not embedded in the application code.

In the frame of the invention, the Javacard application code may include the static objects data embedded therein, only the template data being stored in a separate location. On the contrary, and still in the frame of the invention, a Javacard application may fetch data in a separate location for retrieving static object data, but encompass the template data inside the application code.

In this alternate embodiment, the static objects used by the application are stored in one or several separate files dedicated to such strings, and each string is identified by an identifier, for example a scalar. A Javacard API similar to the previously described API 18 allows the applet 12 to retrieve the static object data in the separate file in the form of a bytearray constituting the string, by using the identifier of such string. The API opens the file containing such a static string resource and gets a bytearray from an identifier of the string as extracted from the application.

In those different embodiments, the advantages are the following ones: Building dynamic HTML pages previously required heavy string manipulations and concatenations. Most of the strings used in dynamic web pages are actually static. The only possibility for describing a string was a bytearray in the application code. Static parts of HTML pages had to be described in static bytearrays and be hardcoded in the JavaCard application. For example, static strings used for building HTML pages were hardcoded in the application source code, they could not be easily updated for customization/internationalization purposes. Customization of static strings is also useful for instance for fixing a bug.

Apart from reinstalling a new ".cap" file with updated constants, internationalization was also achieved by hardcoding the different languages strings within the applet's code or by managing several versions of the same application in the token.

Nor did Javacard provide any efficient way for concatenating static strings for building complex HTML pages. Therefore, application logic was in charge of concatenating the string bytearrays with dynamic elements in order to build the dynamic content. Due to lack of support for bytearray concatenation in Javacard, and comprising no separate string object as proposed here, building a dynamic HTML page required a lot of manual buffer operations and was therefore very slow.

In terms of code size and performances, the described API which fetches string resources allows to limit bytearray manipulation in JavaCard applications. In addition, constant scalar identifiers are used in place of static bytearray strings in the application, which reduces code size and increases performances.

The strings included in the separate resource files can be customized according to customer requirements. For instance, one string containing the operator name might be easily changed without amending the application code.

Static string files can be updated remotely through classical remote file management techniques in order to fix potential bugs or slightly update the application.

Several internationalization resource files can exist on the card, one for each national language. The JavaCard application can choose the one adapted to current user language preferences. New languages might also be easily deployed post issuance as downloaded updates of static objects in corresponding files.

Due to the storing of the template in a separate file location, a template can be processed internally by the API, using native services. This also reduces the need for buffer manipulation in JavaCard and improves performances.

Templates can be easily customized based on customer requirements, without changing the application code.

Templates can be updated remotely through classical remote file management techniques in order to fix potential bugs or slightly update the look of the application.

Several templates can exist on the card, one for each national language. JavaCard application can choose the one adapted to current user language preferences. New languages might also easily be deployed post issuance as downloaded new language templates in a corresponding file.

The invention claimed is:

1. A personal token, comprising
a memory configured to store a Javacard application code,
wherein the personal token is configured to execute the Javacard application code so as to deliver HTML page data to an external device for the external device to display an HTML page on the basis of the such delivered HTML page data,
wherein the personal token is further configured to store data to be used as a constructing part of the HTML page,
wherein the data comprises at least one file comprising a contributing part of the HTML page and wherein the at least one file is stored separate from the memory area over which the Javacard application code is stored,
wherein the contributing part of HTML page comprises an HTML page template,
wherein the Javacard application code comprises a callback module configured to pass dynamic objects into the HTML page template,
wherein the personal token further comprises an application programming interface (API) configured to open and read content of at least one file in response to the Javacard application code requesting such opening to said API,
wherein the at least one file comprises at least an identifier for a dynamic object of the HTML page, and wherein the API is configured to parse the at least one file which stores the HTML page template into at least one static object and at least one dynamic object identifier, wherein the API is configured to transmit the at least one static object to the external device and transmit the at least one dynamic object identifier to the callback module of the Javacard application code, and
wherein the personal token is configured to open the at least one file when the data is requested for delivery of the HTML page data to the external device.

2. The personal token of claim 1, wherein the API is programmed to launch the callback module every time the API is configured to identify that the dynamic object is required in the HTML page template.

3. The personal token of claim 1, wherein the API is configured to transmit the at least one static object to the external device without transmitting the at least one static object to the Javacard application code.

4. The personal token of claim 1, wherein the contributing part of the HTML page comprises the at least one static object to be introduced in the HTML page.

5. The personal token of claim 1, wherein the at least one file is a Tag Length Value (TLV) type file.

6. The personal token of claim 1, wherein the at least one file comprises a plurality of HTML page templates and wherein the Javacard application code comprises an identifier of one of the plurality of HTML page templates to be used as the contributing part of the HTML page, wherein the HTML page template is one of the plurality of HTML page templates.

7. A method for implementing a Javacard application code in a personal token, comprising:
downloading the Javacard application code over an area of memory of the personal token, wherein the Javacard application code comprises a callback module configured to pass dynamic objects into an HTML page template,
downloading data to be used as a contributing part of an HTML page into at least one file, wherein the contributing part of the HTML page comprises the HTML page template, wherein the at least one file is downloaded into a separate area of the memory from the area of memory over which the Javacard application code is downloaded,
programming the personal token for opening the at least one file when the contributing part is requested by the Javacard application code,
wherein the personal token comprises an application programming interface (API) configured to open and read content of the at least one file in response to the Javacard application code requesting such opening to said API, and
wherein the at least one file comprises at least an identifier for a dynamic object of the HTML page, and wherein the API is configured to parse the at least one file which stores the HTML page template into at least one static object and at least one dynamic object identifier, wherein the API is configured to transmit the at least one static object to an external device and transmit the at least one dynamic object identifier to the callback module of the Javacard application code.

8. The method of claim 7, wherein the Javacard application code and the contributing part of the HTML page are downloaded into the personal token at different times.

9. The method of claim 7, further comprising updating the contributing part of the HTML page by downloading an updated contributing part of the HTML page without downloading any updated Javacard application code.

* * * * *